(12) United States Patent
Ueda et al.

(10) Patent No.: US 6,511,623 B1
(45) Date of Patent: Jan. 28, 2003

(54) MANUFACTURING METHOD OF FILTER ELEMENT

(75) Inventors: Noriya Ueda, Hekinan (JP); Ikuo Mochizuki, Jackson, FL (US)

(73) Assignee: Denso Corporation (JP)

( * ) Notice: Subject to any disclaimer, the term of this patent is extended or adjusted under 35 U.S.C. 154(b) by 0 days.

(21) Appl. No.: 09/551,943

(22) Filed: Apr. 19, 2000

(30) Foreign Application Priority Data

Apr. 22, 1999 (JP) .......................................... 11-115274

(51) Int. Cl.[7] .................... B29C 37/02; B29C 69/02; B29C 53/04; B29C 43/38
(52) U.S. Cl. ................... 264/161; 264/138; 264/287; 264/296; 264/322; 264/324; 264/327; 264/519; 425/391; 493/463
(58) Field of Search ................... 264/138, 161, 264/286, 287, 296, 324, 327, 519, 320, 322; 425/391; 493/463

(56) References Cited

U.S. PATENT DOCUMENTS

| 3,194,283 A | * | 7/1965 | Young et al. ............... 140/107 |
| 3,676,542 A | * | 7/1972 | Maltby ....................... 264/244 |
| 4,636,231 A | | 1/1987 | Thornton et al. ............. 55/318 |
| 4,834,700 A | * | 5/1989 | Kondo et al. ............... 264/324 |
| 5,064,598 A | * | 11/1991 | Seiler ......................... 264/230 |
| 5,368,925 A | * | 11/1994 | Hosokawa et al. .......... 428/373 |
| 5,674,302 A | | 10/1997 | Nakayama et al. ........ 55/385.3 |
| 5,720,790 A | | 2/1998 | Kometani et al. ............ 55/497 |
| 5,888,442 A | | 3/1999 | Kometani et al. .......... 264/296 |
| 5,993,580 A | * | 11/1999 | Nakayama et al. .......... 156/148 |

FOREIGN PATENT DOCUMENTS

| EP | 0692294 A1 | 1/1996 | |
| GB | 1367226 | 9/1974 | |
| JP | 11-221848 A | * 8/1999 | ........... B29C/51/14 |

* cited by examiner

Primary Examiner—Jan H. Silbaugh
Assistant Examiner—Michael I. Poe
(74) Attorney, Agent, or Firm—Nixon & Vanderhye PC

(57) ABSTRACT

A manufacturing method for a filter element having a filter portion and a flange portion formed along an outer periphery of the filter portion to protrude outwardly. First, a corrugated intermediate product having plural ridges of the filter element is formed by folding. Next, the flange portion is formed integrally with the filter portion by pressing an outer peripheral portion of the intermediate product at a high temperature. While the flange portion is formed, each of sides of the intermediate product extending in parallel with the ridges is restricted to a position corresponding to a shape of the filter element by plural forming jigs. Therefore, sides of the flange portion extending in parallel with the ridges are formed simultaneously when the flange portion is formed and do not need to be trimmed after forming. As a result, a material of the filter element is less wasted.

13 Claims, 9 Drawing Sheets

MANUFACTURING METHOD OF FILTER ELEMENT

CROSS REFERENCE TO RELATED APPLICATIONS

This application relates to and claims priority from Japanese Patent Application No. 11-115274 filed on Apr. 22, 1999, the contents of which are hereby incorporated by reference.

BACKGROUND OF THE INVENTION

1. Field of the Invention

The present invention relates generally to filter elements, and particularly to a manufacturing method for a filter element having a corrugated filter portion. The filter element is suitably used for an air cleaner of a vehicle internal combustion engine.

2. Related Art

As shown in FIGS. 11A–11C, JP-A-8-309136 discloses a manufacturing method for a filter element 550 having a corrugated filter portion 510 and a flange portion 520 formed along an outer periphery of the filter portion 510 to protrude outwardly. As shown in FIGS. 11A and 11B, the flange portion 520 is integrally formed with the filter portion 510 by pressing an outer peripheral portion of a corrugated intermediate product 500 having plural ridges 510a of the filter element 550 at a high temperature. After the flange portion 520 is formed, the flange portion 520 is trimmed by cutting away an excess portion 530 of the flange portion 520 disposed outside a broken line "a" in FIG. 11B along a whole periphery of the flange portion 520. As a result, as shown in FIG. 11C, the filter element 550 is formed. As shown in FIG. 11B, a width of the flange portion 520 including the excess portion 530 in a direction perpendicular to the ridges 510a needs to have a relatively large value such as 330 mm, so that the flange portion 520 has a necessary width in the direction perpendicular to the ridges 510a after trimming.

However, in the above-mentioned method, since the flange portion 520 needs to be trimmed along the whole periphery thereof to have a predetermined dimension, a relatively large amount of material of the filter element 550 is wasted. Further, when the flange portion 520 is trimmed, trimmings of the flange portion 520 may adhere to a surface of the filter portion 510 and worsen a filtering performance of the filter portion 510.

SUMMARY OF THE INVENTION

In view of the foregoing problems, it is an object of the present invention to provide a manufacturing method for a filter element in which a less amount of material of the filter element is wasted.

According to the present invention, a filter element having a filter portion and a flange portion formed along an outer periphery of the filter portion to protrude outwardly is manufactured as follows. First, a corrugated intermediate product having a plurality of ridges is formed by folding a filter material. The intermediate product has a first side extending in substantially parallel with the ridges and a second side extending in a direction substantially perpendicular to the ridges. Next, the filter portion and the flange portion are integrally formed respectively from a center portion and an outer peripheral portion of the intermediate product. While the flange portion is formed, the first side of the intermediate product is restricted to a predetermined position corresponding to a shape of the filter element.

As a result, a side of the flange portion extending in parallel with the ridges is formed simultaneously when the flange portion is formed, and does not need to be trimmed after forming. Therefore, a material waste of the filter element is reduced. Further, since the intermediate product is restricted to the predetermined position only at the first side which extends in substantially parallel with the ridges during forming, a non-uniform deformation of a corrugated shape of the filter portion is maintained minimum. As a result, a filtering performance of the filter element is not affected.

Preferably, the filter material includes a first fiber having a first melting point and a second fiber having a second melting point which is lower than the first melting point. The flange portion is formed by pressing the outer peripheral portion of the intermediate product at the second melting point and over.

BRIEF DESCRIPTION OF THE DRAWINGS

This and other objects and features of the present invention will become more readily apparent from a better understanding of the preferred embodiments described below with reference to the accompanying drawings, in which.

DETAILED DESCRIPTION OF THE PREFERRED EMBODIMENTS

Preferred embodiments of the present invention are described hereinafter with reference to the accompanying drawings.

First Embodiment

A first preferred embodiment of the present invention will be described with reference to FIGS. 1–6C. In the first embodiment, the present invention is applied to a filter element for an air cleaner.

Figure 1:
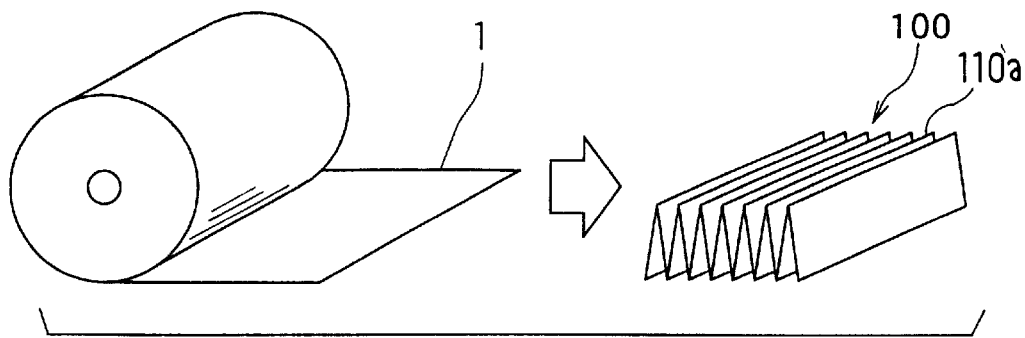
FIG. 1 is a perspective view showing a material and an intermediate product of a filter element according to a first preferred embodiment of the present invention.

As shown in FIG. 1, a corrugated intermediate product 100 of a filter element 150 is formed by folding a material sheet 1 to have plural ridges 110a. In the first embodiment, the material sheet 1 is a non-woven fabric sheet made of main artificial fiber having a high melting point and adhesion artificial fiber having a low melting point. The main fiber is polyester fiber having a melting point of 250° C., and the adhesion fiber is modified polyester fiber having a melting point of 160° C., for example.

Figure 2A:
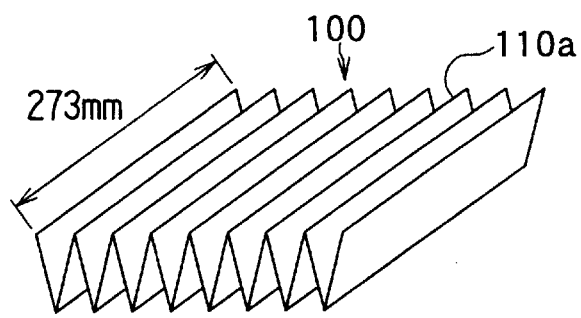
FIGS. 2A–2C are perspective views showing a forming process of the filter element according to the first embodiment.
Figure 2B:
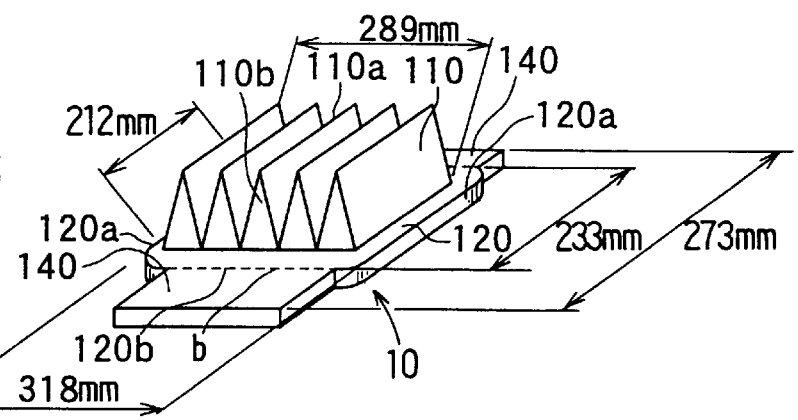
Figure 2C:
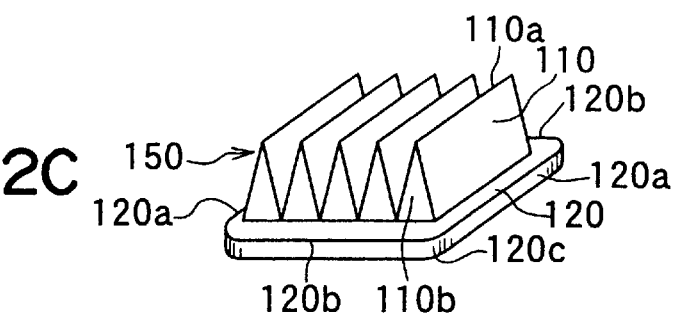

As shown in FIGS. 2A–2C, a corrugated filter portion 110 and a flange portion 120 are integrally formed from the intermediate product 100. The flange portion 120 is formed along an outer periphery of the filter portion 110 to protrude outwardly. As shown in FIG. 2B, two sides 120a of the flange portion 120 extending in parallel with the ridges 110a are formed simultaneously when the flange portion 120 is formed. When the flange portion 120 is formed, an excess portion 140 is formed outside a broken line "b" in FIG. 2B at each of two sides 120b of the flange portion 120 extending in a direction perpendicular to the ridges 110a. Therefore, as shown in FIG. 2C, the filter element 150 is formed only by cutting away the excess portion 140 from the flange portion 120. As shown in FIG. 2C, the filter element 150 has plural triangular closed side surfaces 110b at both sides of the filter portion 110 in a direction parallel with the ridges 110a. Each of the side surfaces 110b is formed between each of the ridges 110a and the flange portion 120.

The flange portion 120 is air-tightly held by side surfaces of a case (not shown) of the air cleaner facing each other. When the flange portion 120 is formed to have a certain elasticity, the flange portion 120 functions as a sealing portion. In the first embodiment, each dimension of the intermediate product 100 and the filter element 150 is set as shown in FIGS. 2A–2C.

Figure 3:
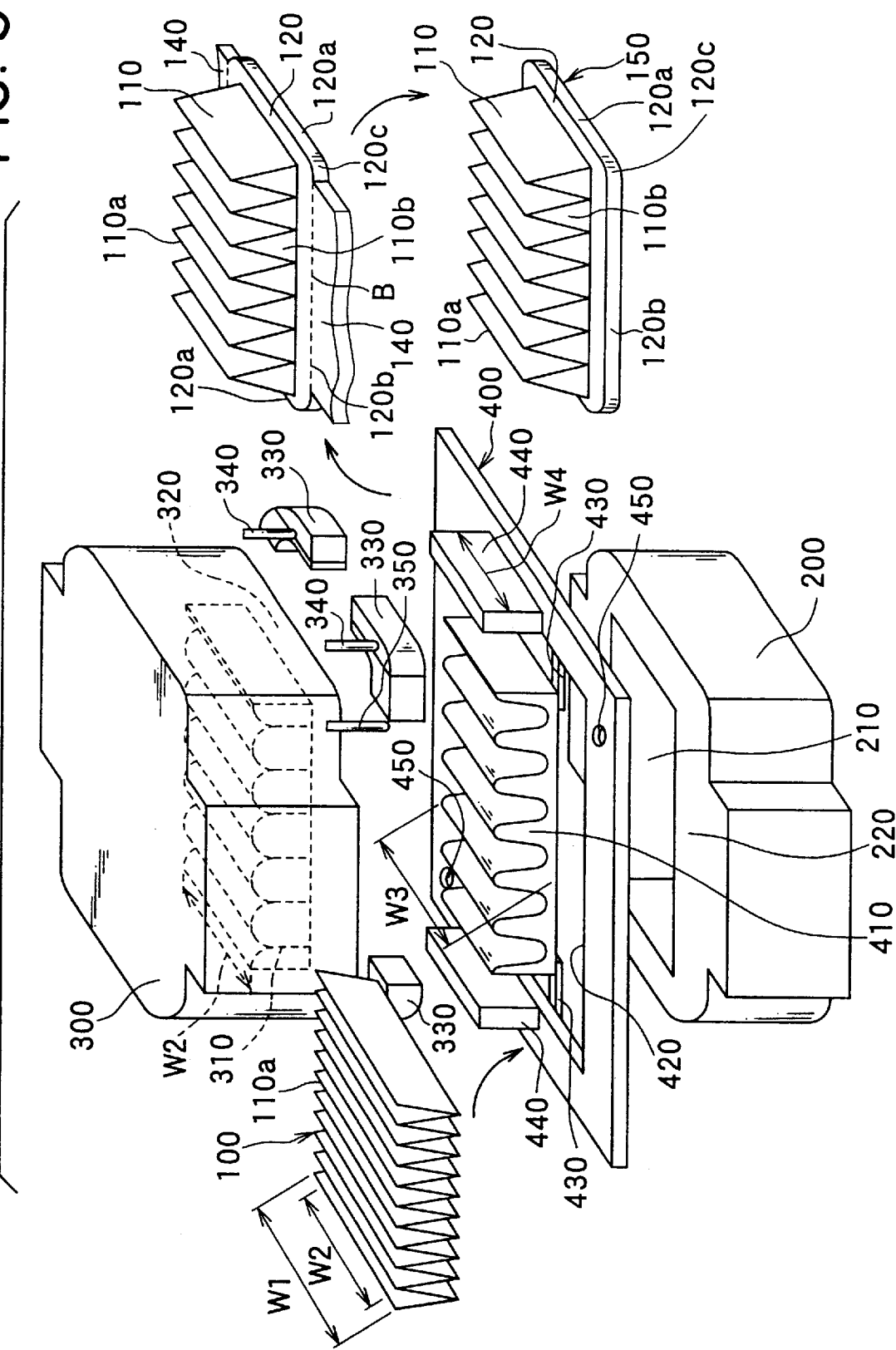
FIG. 3 is a perspective view showing a forming device for forming the filter element according to the first embodiment.

Next, a forming device for forming the flange portion 120 by pressing at a high temperature will be described. As shown in FIG. 3, the forming device has a stationary lower die 200 and a movable upper die 300. The lower die 200 has a rectangular lower recess 210 at a center thereof and a flat pressing surface 220 formed along an outer periphery of the lower recess 210. The upper die 300 is vertically moved by a driving mechanism (not shown). The upper die 300 has a corrugated upper recess 310 formed to correspond to the lower recess 210 of the lower die 200. As shown in FIG. 3, the upper recess 310 has a width w2 which is smaller than a width w1 of the intermediate product 100 by a predetermined value in a direction parallel with the ridges 110a. In the first embodiment, the width w1 is set to 273 mm and the width w2 is set to 212 mm. Therefore, a center portion of the intermediate produce 100 having the width w2 is accommodated in the upper recess 310 of the upper die 300.

The upper die 300 has a flat pressing surface 320 formed along an outer periphery of the upper recess 310. The pressing surface 320 is disposed to face the pressing surface 220. The flange portion 120 is pressed between the pressing surface 220 and the pressing surface 320 while heated. Each of the lower and upper dies 200, 300 has an electric heater (not shown) embedded therein for heating each of the lower and upper dies 200, 300. The electric heaters are respectively disposed along whole peripheries of the lower and upper dies 200, 300 adjacent to the pressing surfaces 220, 320. The electric heaters heat the lower and upper dies 200, 300 at a temperature such as 230° C., which is lower than the melting point of the main fiber and is higher than the melting point of the adhesion fiber.

Still referring to FIG. 3, a carrying plate 400 for holding and carrying the intermediate product 100 while the filter element 150 is formed has a corrugated rectangular holder 410. The holder 410 is disposed at a center of the carrying plate 400 to upwardly protrude. The holder 410 has a width w3 slightly smaller than the width w2 in the direction parallel with the ridges 110a. In the first embodiment, the width w3 is set to 210.5 mm. The carrying plate 400 has an opening 420 formed to surround the holder 410. A dimension of the opening 420 is determined so that an outer periphery of the opening 420 is disposed outside the lower and upper dies 200, 300 when the lower and upper dies 200, 300 contact each other. As a result, when the flange portion 120 is formed, the lower and upper dies 200, 300 are disposed inside the opening 420.

Four connecting rods 430 protrude horizontally from a bottom of end surfaces of the holder 400 in the direction perpendicular to the ridges 110a. The holder 400 is integrally connected to the carrying plate 400 through the connecting rods 430. The pressing surface 220 of the lower die 200 has four recesses (not shown) in which the four connecting rods 430 are respectively accommodated. The lower die 200 also has a movable jig (not shown). As the upper die 300 is moved vertically, the movable jig is moved horizontally by a driving mechanism (not shown) provided in the upper die 300. After the four connecting rods 430 are respectively accommodated in the recesses of the pressing surface 220, the movable jig moves horizontally toward the recesses and fills up the recesses so that an upper surface of the movable jig makes a part of an upper surface of the pressing surface 220.

The carrying plate 400 has a pair of forming jigs 440 disposed away from each other and secured to the carrying plate 400. Each of the forming jigs 440 restricts each of the sides 120a of the flange portion 120 to a position corresponding to a shape of the filter element 150 while the flange portion 120 is formed. Each of the forming jigs 440 is formed into a flat plate extending in the direction parallel with the ridges 110a. An inside surface of each of the forming jigs 440 is disposed opposite each of the end surfaces of the holder 410. The inside surface of each of the forming jigs 440 and an inner-side wall of the carrying plate 400 which defines the opening 420 make the same surface.

Each of the forming jigs 440 has a width w4 smaller than the width w3 of the holder 410. In the first embodiment, the width w4 is set to 180 mm. The forming jigs 440 are made of heat insulating material to restrict a temperature of the intermediate product 100 from decreasing when the forming jigs 440 contact the intermediate product 100 during a forming process of the flange portion 120. Preferably, the forming jigs 440 are made of resin which has a sufficiently high heat-resistance to resist a forming temperature (e.g., 230° C.) of the flange portion 120, and has a relatively high dimensional precision for machining. The forming jigs 440 are made of 100% polyimide resin, for example.

Figure 4A:
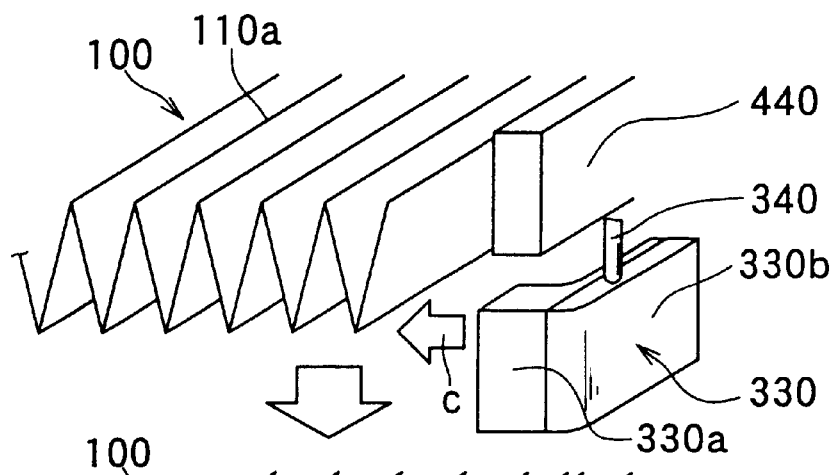
FIGS. 4A–4D are partial perspective views showing a forming process of a flange portion of the filter element according to the first embodiment.
Figure 4B:
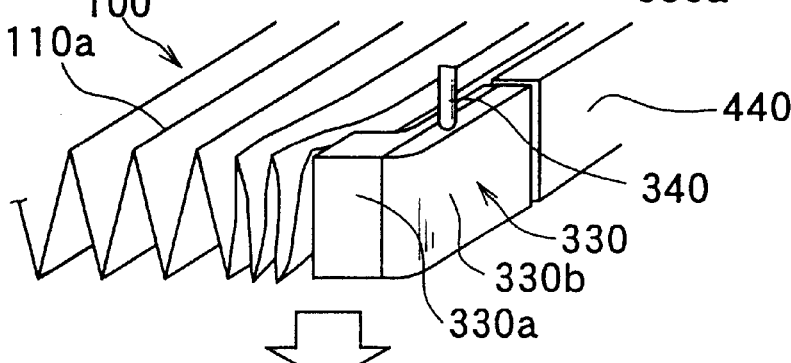

The upper die 300 has four arc-shaped auxiliary forming jigs 330 for forming four arc-shaped corners 120c of the flange portion 120. Each of the auxiliary forming jigs 330 is held by the upper die 300 at a position corresponding to each of the corners 120c of the flange portion 120, and is connected to a push-in mechanism (not shown) through a connecting pin 340. As shown in FIGS. 4A and 4B, each of the auxiliary forming jigs 330 is lowered and is moved toward the intermediate product 100 in a direction indicated by an arrow "c" in FIG. 4A to be disposed next to the respective forming jig 440. Then, as shown in FIG. 4C, the upper die 300 is lowered to form the flange portion 120.

Figure 4C:
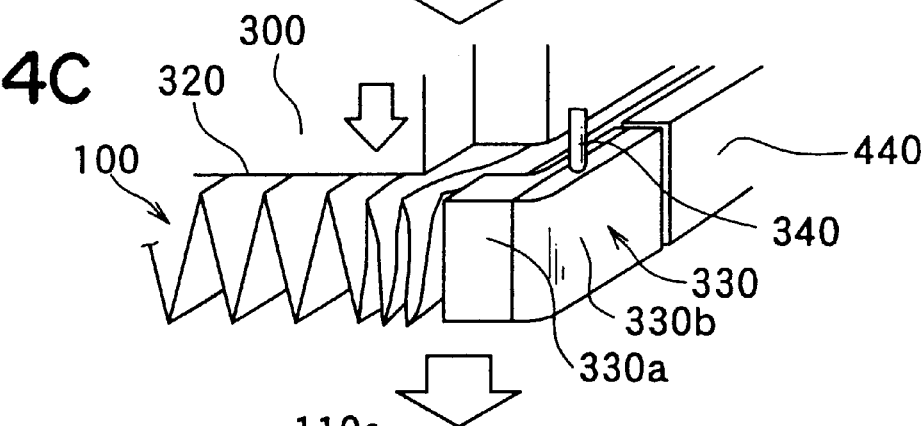
Figure 4D:
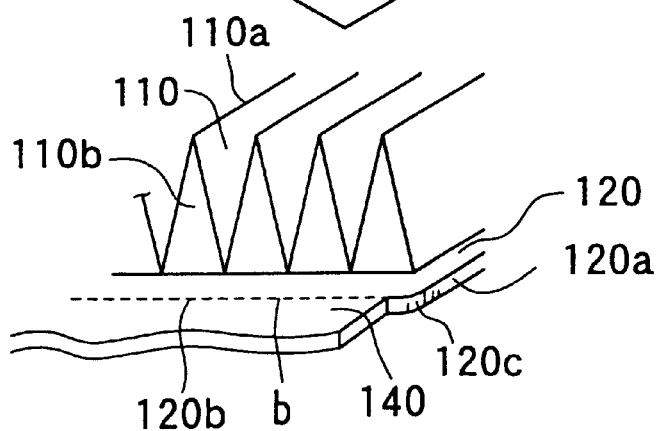

As shown in FIGS. 4A–4C, each of the auxiliary forming jigs 330 has an arc-shaped portion 330a and a reinforcing portion 330b disposed outside the arc-shaped portion 330a for reinforcing the arc-shaped portion 330a. The arc-shaped portion 330a and the reinforcing portion 330b are integrally connected with each other by a fastening member (not shown) such as a bolt. The arc-shaped portion 330a is made of heat insulating material such as the above-mentioned 100% polyimide resin. As a result, a temperature of the intermediate product 100 is restricted from decreasing when the arc-shaped portion 330a contacts the intermediate product 100 during a forming process of the corners 120c of the flange portion 120. The reinforcing portion 330b is made of metal such as iron. Each of the auxiliary forming jigs 330 is connected to each of the connecting pins 340 through the reinforcing portion 330b. Further, since a strength of the arc-shaped portion 330a is increased by the reinforcing portion 330b, each of the corners 120c of the flange portion 120 is pushed to a predetermined position by each of the auxiliary forming jigs 330 with a uniform force.

Referring back to FIG. 3, the carrying plate 400 has two positioning holes 450 disposed diagonally at an outer peripheral portion thereof. The upper die 300 has two positioning pins 350. Each dimension of the positioning holes 450 and the positioning pins 350 is set so that each of the positioning pins 350 is snugly inserted into the respective positioning hole 450 without rattle. Each of the positioning pins 350 is moved by a pin-driving mechanism (not shown) and is inserted into the respective positioning hole 450 before the upper die 300 is lowered.

The carrying plate 400 is installed on a rotation index device (not shown). As the rotation index device is rotated, the carrying plate 400 is inserted into or discharged from a space between the lower and upper dies 200, 300 of the forming device. After the filter element 150 is formed, the rotation index device is rotated so that the carrying plate 400 is discharged from the forming device and is inserted into a cooling device to be cooled.

Next, a manufacturing method of the filter element 150 will be described with reference to FIGS. 1–6C.

(1) Forming the Intermediate Product 100

As shown in FIG. 1, the corrugated intermediate product 100 is formed by folding the material sheet 1.

(2) Mounting the Intermediate Product 100 on the Carrying Plate 400

The carrying plate 400 installed on the rotation index device is placed outside the lower and upper dies 200, 300 of the forming device. The intermediate product 100 is mounted on the holder 410 so that a corrugated shape of the intermediate product 100 is fit to a corrugated shape of the holder 410. During the mounting process, only both end portions of the intermediate product 100 in a direction perpendicular to the ridges 110a are restricted by the forming jigs 440, and any other portion of the intermediate product 100 is not restricted. Therefore, the intermediate product 100 is relatively readily mounted on the carrying plate 400. If the auxiliary forming jigs 330 are integrally formed with the forming jigs 440 on the carrying plate 400, corners of the intermediate product 100 need to be bent inside, thereby worsening mountability of the intermediate product 100 to the carrying plate 400.

(3) Forming the Filter Element

After the intermediate product 100 is mounted on the carrying plate 400, firstly, the rotation index device is rotated by a predetermined angle so that the carrying plate 400 is disposed between the lower die 200 and the upper die 300. Next, each of the positioning pins 350 is lowered by the pin-driving mechanism and is inserted into the respective positioning hole 450. When each of the positioning pin 350 is snugly inserted in the respective positioning hole 450, the carrying plate 400 is precisely positioned with respect to the lower and upper dies 200, 300.

Then, the carrying plate 400 is lowered by a plate-driving mechanism (not shown) so that each of the connecting rods 430 is accommodated in the respective recess of the pressing surface 220 of the lower die 200. At this point, the holder 410 is disposed inside the lower recess 420 of the lower die 200. Therefore, a bottom of the holder 410 does not interfere with the pressing surface 220 of the lower die 200.

Next, as the upper die 300 starts to be lowered, the movable jig of the lower die 200 is horizontally moved toward the recesses of the pressing surface 220 by the driving mechanism of the upper die 300 to fill up the recesses. As a result, the upper surface of the movable jig makes a part of the upper surface of the pressing surface 220. Further, the auxiliary forming jigs 330 are lowered by the push-in mechanism through the connecting pins 340 until the auxiliary forming jigs 330 contact an upper surface of the carrying plate 400. Then, as shown in FIG. 4A, each of the auxiliary forming jigs 330 is moved toward each of the corners of the intermediate product 100 in the direction indicated by the arrow "c" in FIG. 4A. Each of the corners of the intermediate product 100 is pushed in to have an arc-shape corresponding to a shape of each of the auxiliary forming jigs 330. Pushing of each of the corners of the intermediate product 100 is completed before the upper die 300 contacts the intermediate product 100.

Figure 5A:
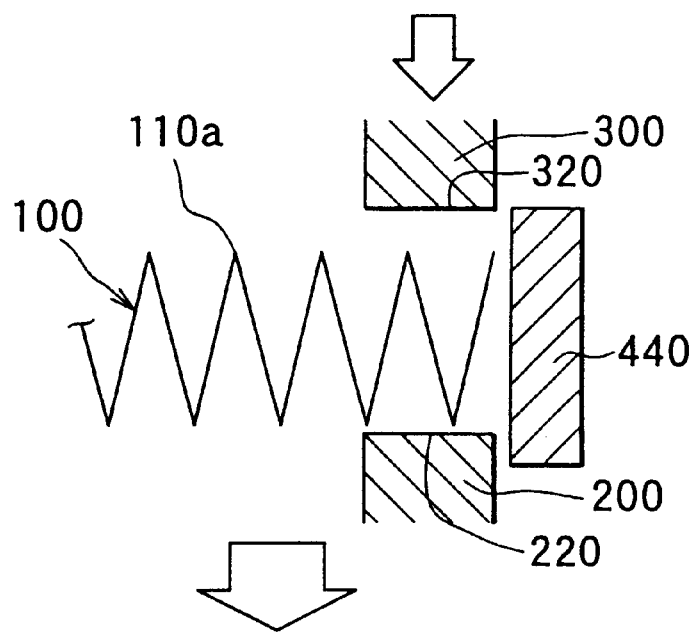
FIGS. 5A–5C are partial sectional views showing a forming process of the flange portion according to the first embodiment.
Figure 5B:
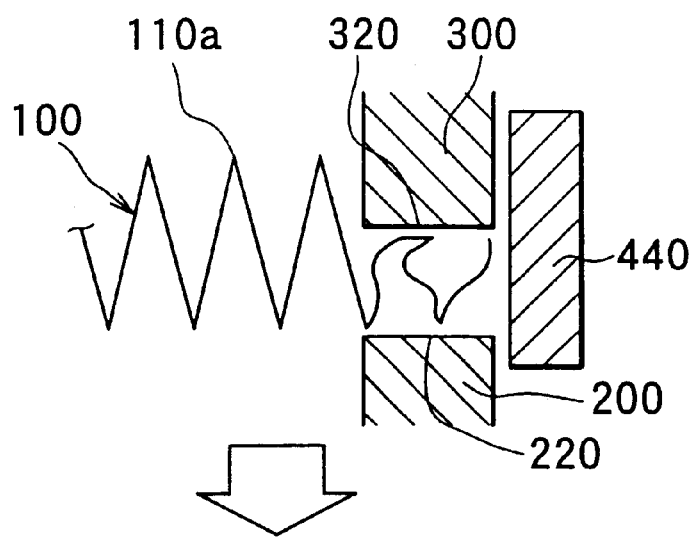
Figure 5C:
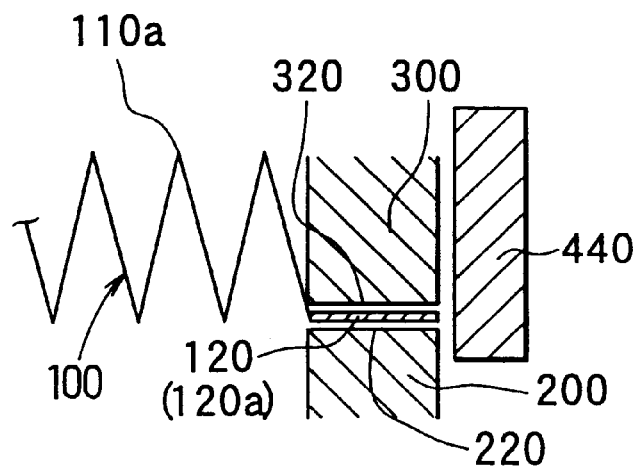

As the upper die 300 is further lowered, the pressing surface 320 of the upper die 300 starts to contact the outer peripheral portion of the intermediate product 100 to form the flange portion 120. The sides 120a of the flange portion 120 is formed as shown in FIGS. 5A–5C. First, as shown in FIG. 5A, each of end portions of the intermediate product 100 in the direction perpendicular to the ridges 110a, corresponding to 1.5 waves, is inserted between the pressing surfaces 220, 320. Then, as shown in FIGS. 5B and 5C, each of the end portions of the intermediate product 100 in the direction perpendicular to the ridges 110a is pressed while heated at 230° C. to form each of the sides 120a of the flange portion 120. While the sides 120a are formed, each of ends of the intermediate product 100 in the direction perpendicular to the ridges 110a is restricted to a position corresponding to the shape of the filter element 150 by the forming jigs 440 and the auxiliary forming jigs 330.

At the same time, each of end portions of the intermediate product 100 in a direction parallel with the ridges 110a is partly disposed between an inner wall of the upper die 300 defining the upper recess 310 and a side surface of the holder 410 in a direction parallel with the ridges 110a to be pressed therebetween while heated, and is partly disposed between the pressing surfaces 220, 320 to be pressed therebetween while heated. As a result, the triangular closed side surfaces 110b and the sides 120b of the flange portion 120 are formed.

While the flange portion 120 is formed, plural reinforcing portions of the filter element 150 are also formed simultaneously. Each of the reinforcing portions is formed by being pressed with a larger pressing force than that of the filter portion 100 to have a smaller thickness and a higher rigidity.

The reinforcing portions are formed at the ridges 120a, a connecting portion between the flange portion 120 and the filter portion 110 and so on.

(4) Cooling the Filter Element

When the above-mentioned forming process is completed, a formed product 10 shown in FIG. 2B is obtained. The formed product 10 has the excess portion 140 protruding outwardly from each of the sides 120b. The rotation index device is rotated by a predetermined angle to insert the carrying plate 400 on which the formed product 10 is mounted into a space between an upper die and a lower die of the cooling device. Cooling water circulates through the cooling device to maintain the cooling device to have a low temperature proximate a room temperature. When the formed product 10 is clamped between the upper and lower dies of the cooling device, the formed product 10 is rapidly cooled.

(5) Trimming the Filter Element

When the formed product 10 is sufficiently cooled, the formed product 10 is discharged from the cooling device and is placed on a cutting device for trimming. The excess portion 140 of the formed product 10 is cut away along the broken line "b" in FIG. 2B, and finally, the filter element 150 is formed as shown in FIG. 2C.

According to the first embodiment, each of the end portions of the intermediate product 100 in the direction perpendicular to the ridges 110a is restricted to a position corresponding to the shape of the filter element 150 while the flange portion 120 is formed. That is, each position of the end portions of the intermediate product 100 in the direction perpendicular to the ridges 110a is determined while the flange portion 120 is formed. As a result, the sides 120a of the flange portion 120 are simultaneously formed when the flange portion 120 is formed, and the sides 120a do not need to be trimmed after forming. Therefore, an amount of material waste of the filter element 150 is reduced. Further, since the intermediate product 100 is restricted only at the end portions in the direction perpendicular to the ridges 110a during forming, non-uniform deformation of a corrugated shape of the filter portion 110 is maintained minimum. As a result, a filtering performance of the filter element 150 is not affected.

Figure 6A:
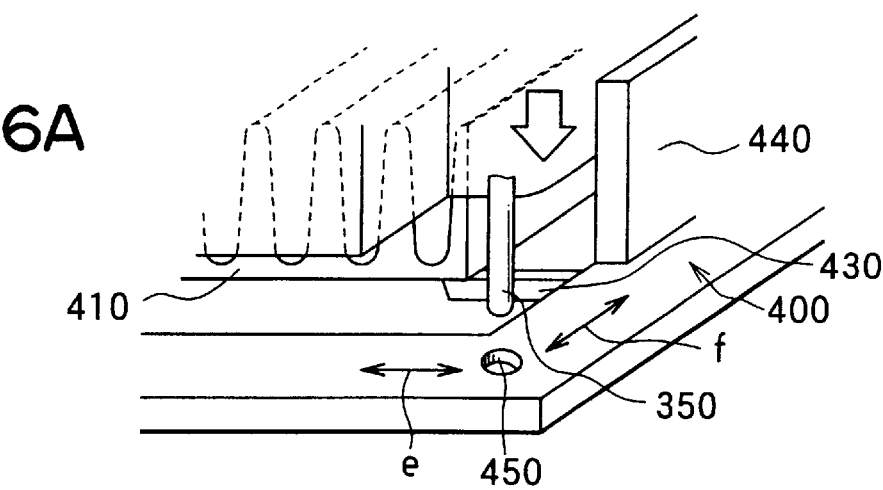
FIG. 6A is a partial perspective view showing a forming process of the flange portion according to the first embodiment.
Figure 6B:
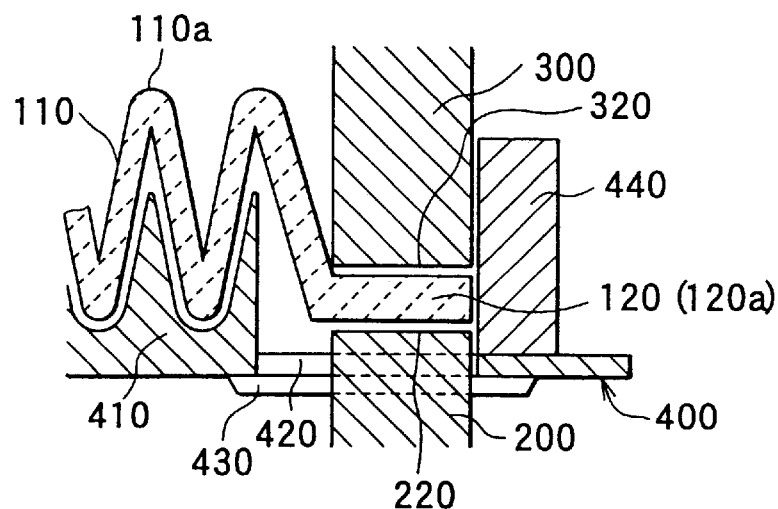
FIG. 6B is a partial sectional view showing the flange portion according to the first embodiment.
Figure 6C:
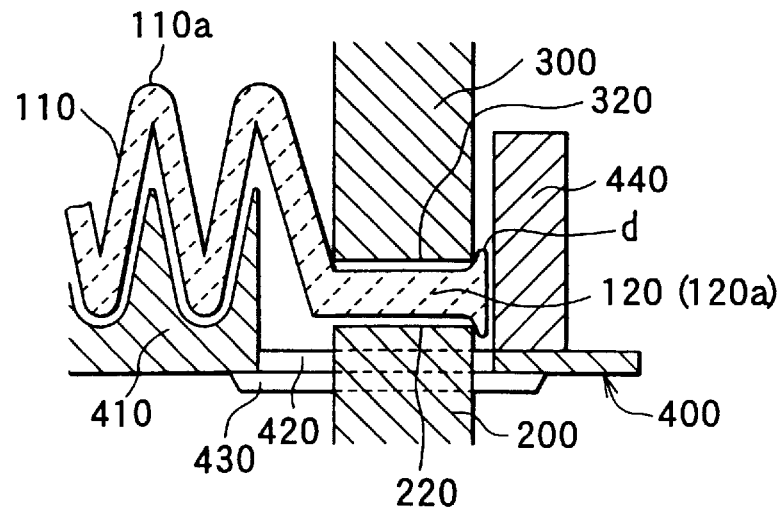
FIG. 6C is a partial sectional view showing a flange portion of a filter element according to a comparison of the first embodiment.

Further, as shown in FIG. 6C, if the carrying plate 400 is not positioned precisely, a gap may be created between each of the forming jigs 440 and the upper or lower die 200, 300. As a result, a burr "d" may be generated at the end portions of the flange portion 120 in the direction perpendicular to the ridges 110a. However, according to the first embodiment, the carrying plate 400 is precisely positioned in a direction of an arrow "e" and in a direction of an arrow "f" in FIG. 6A by the positioning pins 350 and the positioning holes 450. Therefore, as shown in FIG. 6B, a gap between each of the forming jigs 440 and the lower or upper die 200, 300 is decreased to a minimum value such as 0.5 mm or less. As a result, the burr "d" is restricted from being generated.

If the end portions of the intermediate product 100 in the direction parallel with the ridges 110a are also restricted from protruding outwardly by plural forming jigs similar to the forming jigs 440 while being pressed, a corrugated shape of the filter portion 100 may be deformed non-uniformly. As a result, a filter performance of the filter element 150 may be worsened. However, according to the first embodiment, when the flange portion 120 is formed, the end portions of the intermediate product 100 in the direction parallel with the ridges 110a are not restricted from protruding outwardly by any forming jig. Therefore, the corrugated shape of the filter portion 100 is not deformed non-uniformly.

Second Embodiment

A second preferred embodiment of the present invention will be described with reference to FIGS. 7–8D. In this and following embodiments, components which are substantially the same as those in previous embodiments are assigned the same reference numerals.

In the second embodiment, the end portions of the intermediate product 100 in the direction parallel with the ridges 110a and the end portions of the intermediate product 100 in the direction perpendicular to the ridges 110a are both restricted from protruding outwardly while the flange portion 120 is formed. As a result, a whole periphery of the flange portion 120 is formed at one time.

Figure 7:
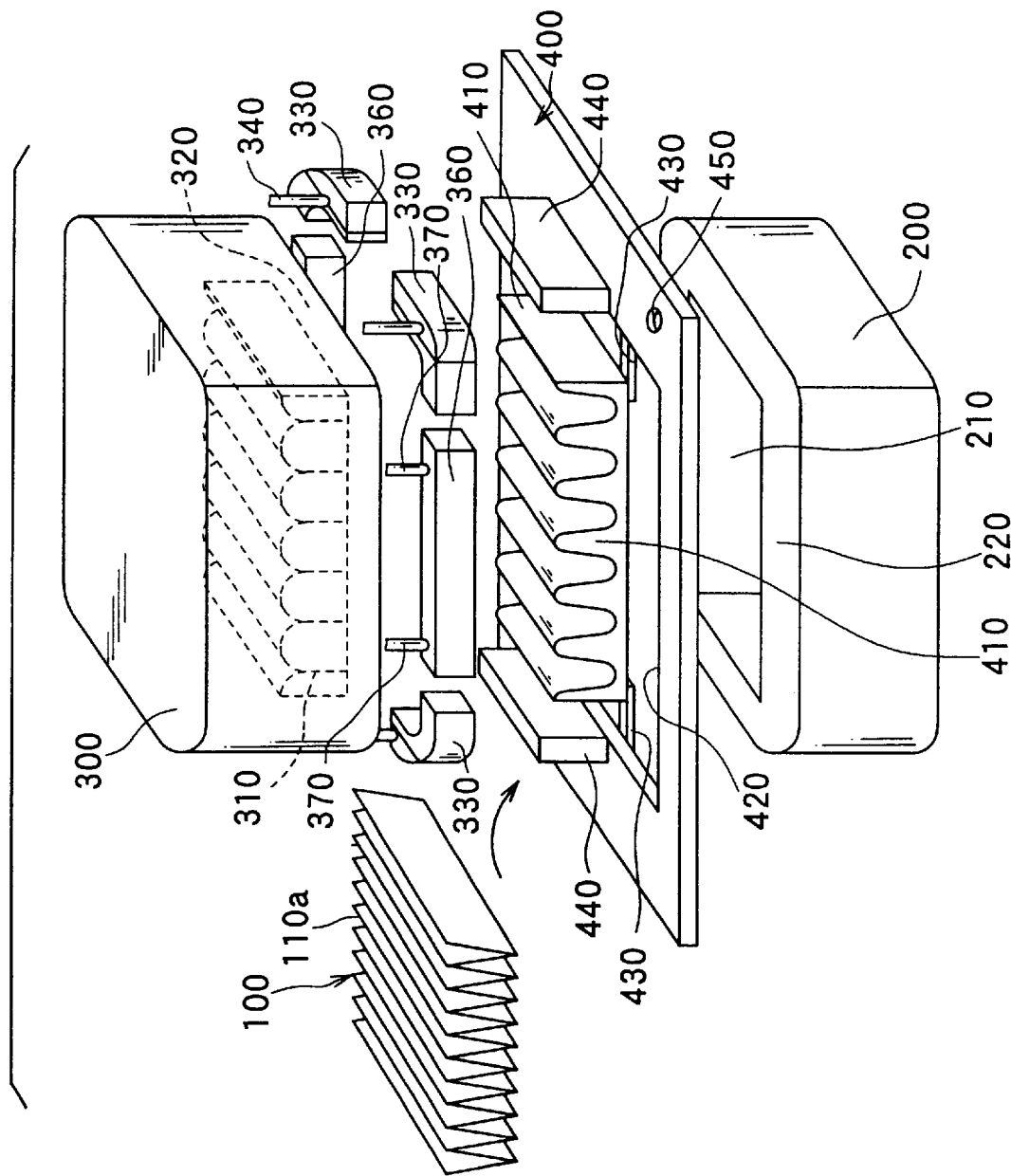
FIG. 7 is a perspective view showing a forming device for forming a filter element according to a second preferred embodiment of the present invention.

In the second embodiment, as shown in FIG. 7, a pair of forming jigs 360 are provided for restricting the end portions of the intermediate product 100 in the direction parallel with the ridges 110a from protruding outwardly while the flange portion 120 is formed. Each of the forming jig 360 is made of heat insulating material and is formed into a flat plate, similarly to the forming jigs 440. Each of the forming jigs 360 is disposed in the upper die 300 through a connecting pin 370 connected to the push-in mechanism.

Figure 8A:
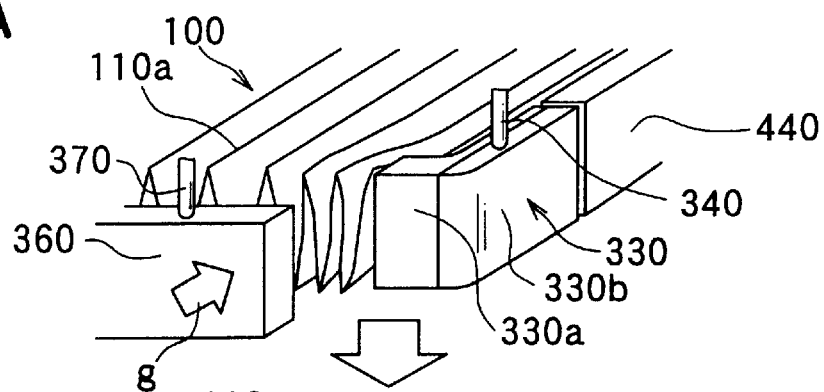
FIGS. 8A–8D are partial perspective views showing a forming process of a flange portion of the filter element according to the second embodiment.
Figure 8B:
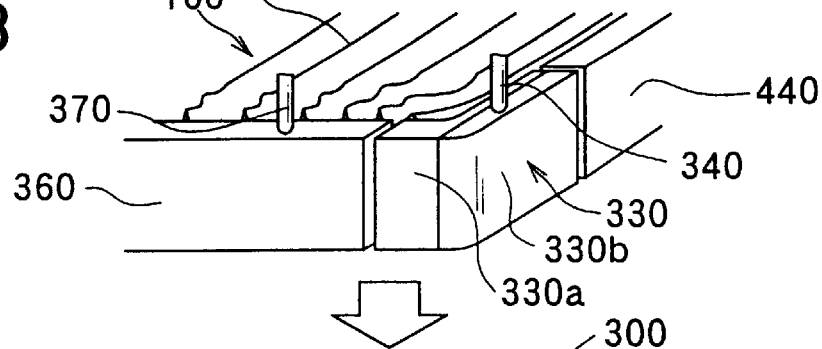
Figure 8C:
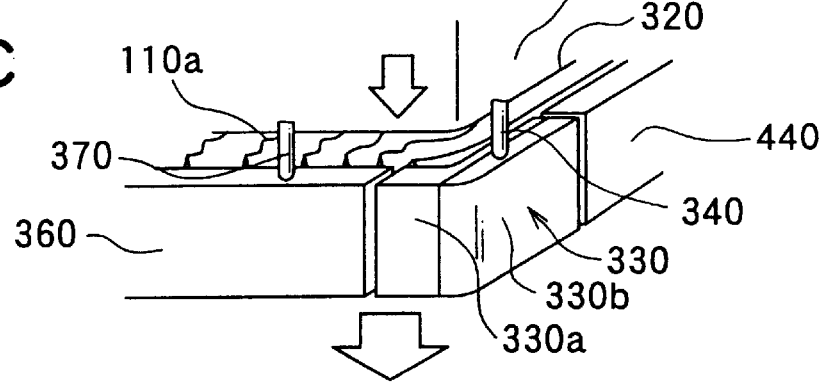
Figure 8D:
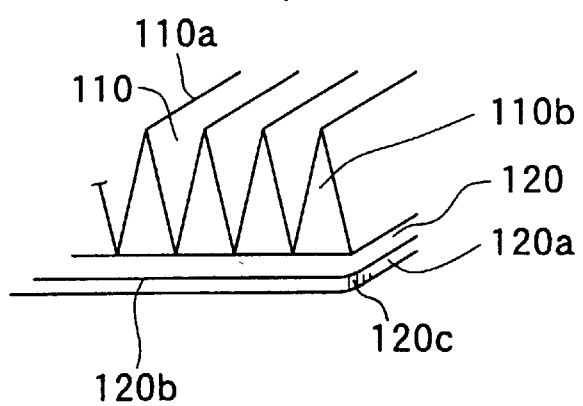

When the upper die 300 is lowered, each of the forming jigs 360 is lowered to a position shown in FIG. 8A by the push-in mechanism. Then, each of the forming jigs 360 is moved in a direction indicated by an arrow "g" in FIG. 8A to reach a position shown in FIG. 8B by the push-in mechanism. In FIG. 8B, the flange portion 120 is surrounded along a whole periphery thereof by the two forming jigs 440, the two forming jigs 360 and the four auxiliary forming jigs 330. Therefore, the whole periphery of the flange portion 120 is restricted from protruding outwardly from the sides 120a and the sides 120b while the flange portion 120 is formed. As a result, when the upper die 300 is lowered as shown in FIG. 8C to form the flange portion 120 by pressing, the filter element 150 is formed into a shape shown in FIG. 8D or FIG. 2C at one time. Therefore, the filter element 150 does not need to be trimmed. However, in the second embodiment, the filter portion 100 may be deformed non-uniformly due to the forming jigs 360.

Third Embodiment

Figure 9:
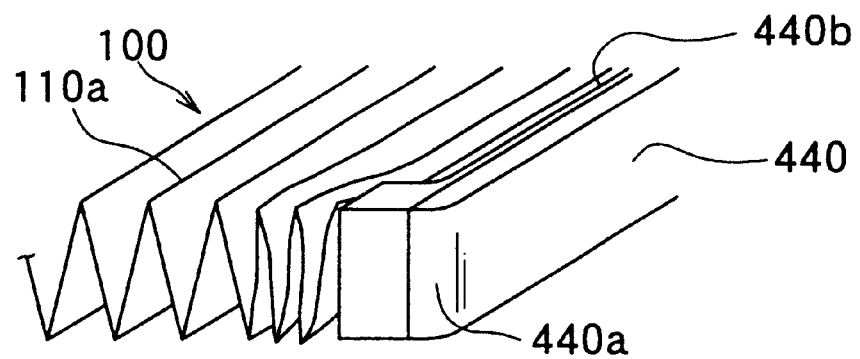
FIG. 9 is a partial perspective view showing a forming jig for forming a filter element according to a third preferred embodiment of the present invention.

A third preferred embodiment of the present invention will be described with reference to FIG. 9.

In the first and second embodiments, the auxiliary forming jigs 330 are separately formed from the forming jigs 440. Therefore, an outer peripheral side surface of the flange portion 120 may have a step at a position corresponding to a boundary between each of the forming jigs 440 and each of the auxiliary forming jigs 330. In the third embodiment, as shown in FIG. 9, each of the forming jigs 440 is integrally formed with an arc-shaped portion 440a which corresponds to the auxiliary forming jig 330 and a heat insulating portion 440b. The heat insulating portion 440b is integrally connected to an inner side of the arc-shaped portion 440a. The arc-shaped portion 440a is made of metal such as iron. The heat insulating portion 440b is made of heat insulating material. According to the third embodiment, the flange portion 120 is restricted from having a step on the outer peripheral side surface thereof.

Figure 10:
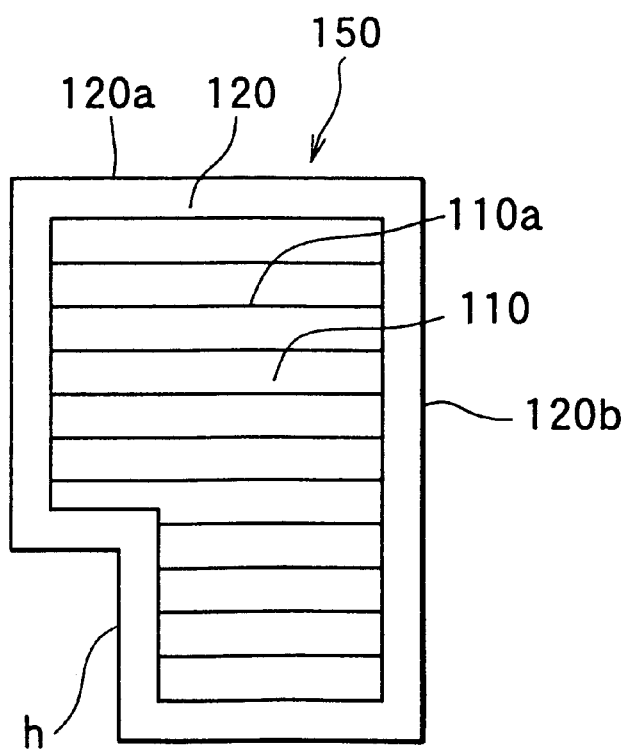
FIG. 10 is a plan view showing a filter element according to a modification of the first embodiment.
Figure 11A:
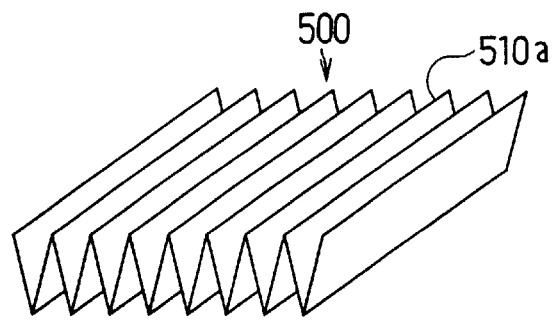
FIGS. 11A–11C are perspective views showing a conventional manufacturing method of a filter element.
Figure 11B:
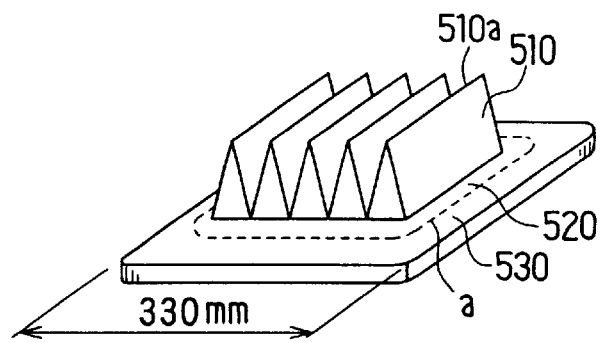
Figure 11C:
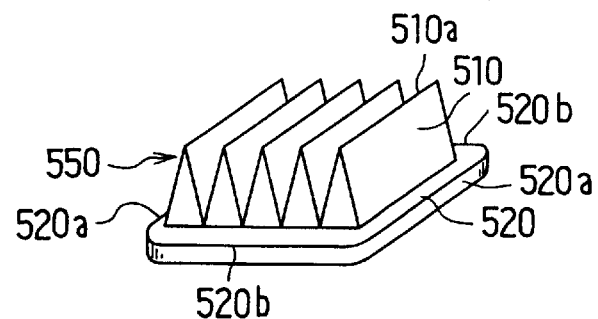

As shown in FIG. 10, the filter element 150 may have any other plan shape such as a rectangular shape having a cut-off portion "h". Further, each of the forming jigs 440, 360 may be made of metal if an electric heater is embedded therein.

Although the present invention has been fully described in connection with preferred embodiments thereof with reference to the accompanying drawings, it is to be noted that various changes and modifications will become apparent to those skilled in the art. Such changes and modifications are to be understood as being within the scope of the present invention as defined by the appended claims.

What is claimed is:

1. A manufacturing method for manufacturing a filter element, the filter element having a filter portion and a flange portion formed along an outer periphery of the filter portion to protrude outwardly, the method comprising steps of:

forming a corrugated intermediate product having a plurality of ridges by folding a filter material, the intermediate product having a first side extending in a direction substantially parallel with the ridges and a second side extending in a direction substantially perpendicular to the ridges;

mounting the intermediate product on a carrying member, the carrying member having a forming jig for restricting the first side to a first predetermined position corresponding to a shape of the filter element;

inserting the carrying member between a first die and a second die which face each other for forming the filter element; and integrally forming the filter portion and the flange portion respectively from a center portion and an outer peripheral portion of the intermediate product, the flange portion being formed between the first and second dies, while restricting the first side of the intermediate product to the first predetermined position with the forming jig.

2. The manufacturing method according to claim 1, wherein the forming jig is made of a heat insulating material.

3. The manufacturing method according to claim 1, wherein the forming jig is made of a polyimide resin.

4. The manufacturing method according to claim 1, wherein:

the first die is stationed and the second die is movable; and a positioning member for positioning the carrying member to a predetermined position is provided between the second die and the carrying member.

5. The manufacturing method according to claim 1, wherein the forming jig is formed into a linear shape extending along the first side.

6. The manufacturing method according to claim 1, wherein the second die has an auxiliary forming jig for forming a corner of the flange portion into an arc-shape.

7. The manufacturing method according to claim 1, further comprising a step of trimming the filter element at only the second side of the intermediate product.

8. The manufacturing method according to claim 1, wherein the second side of the intermediate product protrudes outwardly from an outline of the shape of the filter element during the forming step.

9. The manufacturing method according to claim 1, wherein the second side of the intermediate product is also restricted to a second predetermined position corresponding to the shape of the filter element during the forming step.

10. The manufacturing method according to claim 1, wherein:

the filter material includes a first fiber having a first melting point and a second fiber having a second melting point which is lower than the first melting point; and the flange portion is formed by pressing the outer peripheral portion of the intermediate product at a temperature between the first melting point and the second melting point.

11. The manufacturing method according to claim 10, wherein the first fiber is a main fiber and the second fiber is an adhesive fiber.

12. The manufacturing method according to claim 10, wherein:

the first fiber is a polyester fiber having a melting point of approximately 250° C.; and the second fiber is a modified polyester fiber having a melting point of approximately 160° C.

13. The manufacturing method according to claim 12, wherein the flange portion is formed by pressing at approximately 230° C.

* * * * *